United States Patent
Venkatrao

(10) Patent No.: US 7,366,848 B1
(45) Date of Patent: Apr. 29, 2008

(54) REDUCING RESOURCE CONSUMPTION BY INEFFECTIVE WRITE OPERATIONS IN A SHARED MEMORY SYSTEM

(75) Inventor: Balakrishna Venkatrao, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 266 days.

(21) Appl. No.: 11/143,165

(22) Filed: Jun. 2, 2005

(51) Int. Cl.
*G06F 12/00* (2006.01)

(52) U.S. Cl. .............. 711/147; 711/122; 711/130; 711/144; 711/154; 711/156; 711/205

(58) Field of Classification Search ............... 711/147, 711/122, 130, 144, 154, 156, 205
See application file for complete search history.

(56) References Cited

U.S. PATENT DOCUMENTS

| | | | |
|---|---|---|---|
| 5,560,030 A | | 9/1996 | Guttag et al. |
| 6,438,665 B2 | | 8/2002 | Norman |
| 6,757,793 B1 | * | 6/2004 | Hughes et al. ............. 711/156 |
| 6,785,154 B2 | | 8/2004 | Sunaga et al. |
| 6,944,719 B2 | * | 9/2005 | Rowlands et al. .......... 711/141 |
| 6,973,543 B1 | * | 12/2005 | Hughes ....................... 711/141 |
| 2003/0217238 A1 | * | 11/2003 | Rowlands et al. .......... 711/154 |
| 2004/0068620 A1 | * | 4/2004 | Van Doren et al. ......... 711/144 |
| 2004/0068622 A1 | * | 4/2004 | Van Doren et al. ......... 711/146 |
| 2004/0123052 A1 | * | 6/2004 | Beers et al. ................. 711/150 |

OTHER PUBLICATIONS

Author Unknown, "Latency", Dicitionay.com, Unabridged, Version 1.1, Jan. 2007.
Chang et al., "Cache Memory Protocols", Wiley Encyclopedia of Electrical and Electronics Engineering, John Wiley & Sons, p. 697, Dec. 27, 1999.
Prata, Stephen, "C Primer Plus", Sams Publishing, 5th Edition, Nov. 2004.

* cited by examiner

Primary Examiner—Stephen C. Elmore
(74) Attorney, Agent, or Firm—Dorsey & Whitney LLP

(57) ABSTRACT

In a shared memory system, ineffective write operations ("dead stores") can be handled in a manner to reduce unnecessary consumption of resources. In a shared memory system, when a non-owning processing unit requests data from a shared memory location owned by another processing unit, the memory controller for the shared memory requests a most current copy of the data from the owner processing unit. Instead of the owner processing unit reflexively sending its data to the memory controller, the owner processing unit determines whether the data has been changed, and, if it has not changed, transmits indication of such to the memory controller. Since the data has not changed, then the data at the shared memory location is proper and can be sent to satisfy the requesting processing unit.

20 Claims, 5 Drawing Sheets

REDUCING RESOURCE CONSUMPTION BY INEFFECTIVE WRITE OPERATIONS IN A SHARED MEMORY SYSTEM

BACKGROUND

1. Field of the Invention

The present invention relates to the field of computers. More specifically, the present invention relates to computer architecture.

2. Description of the Related Art

The increasing disparity between processor speeds and memory access speeds exacerbates the already heavy demand on memory bandwidth. In addition, the focus on throughput computing sensitive multi-core processor designs further increases the demand on memory bandwidth.

Write operations consume a significant portion of memory bandwidth. When a write operation is performed, the value of the write operation is written to cache as well as system memory. The moment when the value is written to system memory is dependent upon the write policy implemented, such as writeback versus write-through. Some write operations do not effectively change the corresponding location in system memory or cache. In other words, the write operation is writing the same value that already resides at the destination of the write operation. Although performance of such a write operation does not change the contents of the destination location, memory bandwidth is spent on the write operation, as well as other resources, such as resources expended unnecessarily firing write pins.

In a shared memory system with a directory based coherence protocol, changes of state of a shared memory location are represented in the shared memory's memory controller. When a non-owning processor requests data from a shared memory location, the memory controller determines whether the state of the data at the shared memory location is dirty or clean. If the state of the memory location is dirty (e.g., M or I), then the owning processor is consulted for the most current data for that shared memory location. The memory controller requests the data from the owning processor, and the owning processor transmits the data to the memory controller. The memory controller updates the shared memory location and forwards a copy of the current data to the requestor non-owning processor, and updates the shared memory location with the data from the owning processor. Even if the owning processor's data and the data at the shared memory location are the same, bandwidth is still consumed by the owning processor transmitting the data to the memory controller, which then updates the shared memory location with the received data, even though the data being overwritten is the same as the received data.

SUMMARY

It has been discovered that many write operations are ineffective, and that in a shared memory system a shared memory location may be unchanged despite indication to the contrary by an owner processing unit. Requests from a non-owner processing unit for data from such a shared memory location can be handled in a manner to prevent unnecessary consumption of resources. When a first processing unit requests data from a location in shared memory that is owned by a second processing unit, the second processing unit determines whether the data at the shared memory location is consistent with the second processing unit's version of the data (i.e., second processing unit determines whether the data has been changed). If the data is consistent, then the second processing unit can forego transmitting the data to the memory controller because it is the same data. Instead, the second processing unit indicates to the memory controller of the shared memory location that the data has not been modified. The data requested by the first processing unit is then provided directly from the shared memory location to the first processing unit.

These and other aspects of the described invention will be better described with reference to the Description of the Drawing(s) and accompanying Figures.

BRIEF DESCRIPTION OF THE DRAWING(S)

The present invention may be better understood, and its numerous objects, features, and advantages made apparent to those skilled in the art by referencing the accompanying drawings.

The use of the same reference symbols in different drawings indicates similar or identical items.

DESCRIPTION OF THE DRAWING(S)

The description that follows includes exemplary systems, methods, techniques, instruction sequences and computer program products that embody techniques of the present invention. However, it is understood that the described invention may be practiced without these specific details. For instance, the described invention is described with reference to sniffing or snoopy coherency protocols, although the described invention may also be applied to a directory coherency protocol. In other instances, well-known protocols, structures and techniques have not been shown in detail in order not to obscure the invention.

Figure 1:
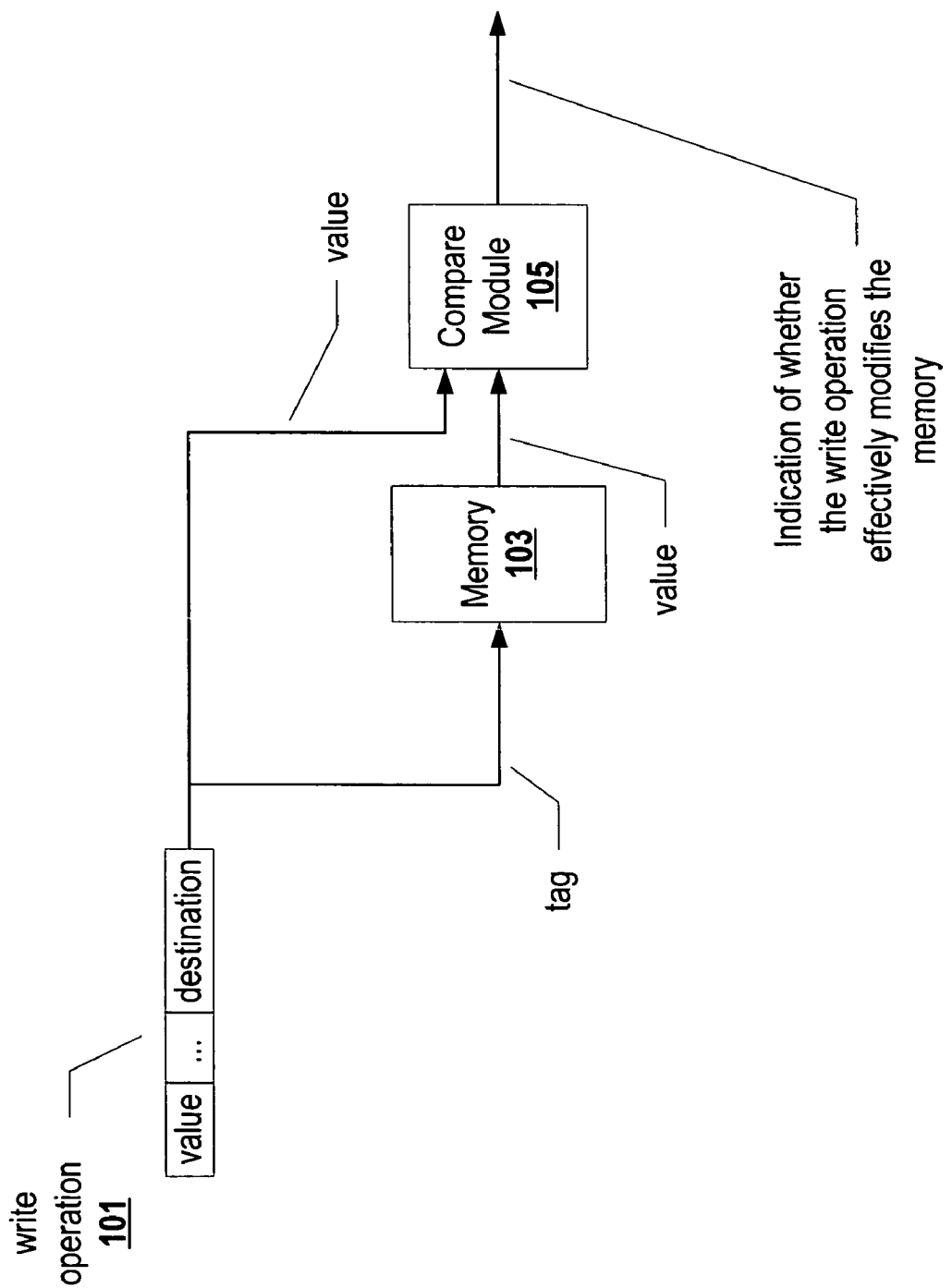
FIG. 1 depicts an exemplary system indicating whether a write operation is ineffective.

FIG. 1 depicts an exemplary system indicating whether a write operation is ineffective. A write operation 101 at least includes a value to be written and a destination where the value is to be written. A portion of the destination, such as the middle bits, are transmitted to a memory 103 as a tag. The tag is used to select a location in the memory 103 that corresponds to the destination of the write operation. The memory may be L1 cache, L2 cache, L3 cache, system memory, etc. Selection of the location in the memory will vary depending on the memory replacement policy being implemented by the system. (e.g., whether the memory is direct mapped or associative, if associative memory then the associativity, etc.). The value of the write operation 101 and the value at the selected location are both transmitted to a compare module 105. The compare module 105 compares the values and determines whether the write operation will effectively modify the target location (i.e., destination). If the write operation does not effectively modify the target location, or destination, then the write operation is not performed. Not performing a write operation may include not writing the value to both locations in a memory hierarchy (e.g., the destination in system memory as wells as the corresponding cache line). Not performing the write operation may include maintaining the status of the entry in the cache (e.g., not changing status of a cache line to dirty).

As already stated, foregoing ineffective write operations reduces the number of write operations that occupy memory bandwidth. Foregoing ineffective write operations also reduces expenditure of resources in performing the write operations, such as power to evict an entry from cache and write a new, albeit same, value, power and time to write to the destination in underlying memory, etc.

Figure 2:
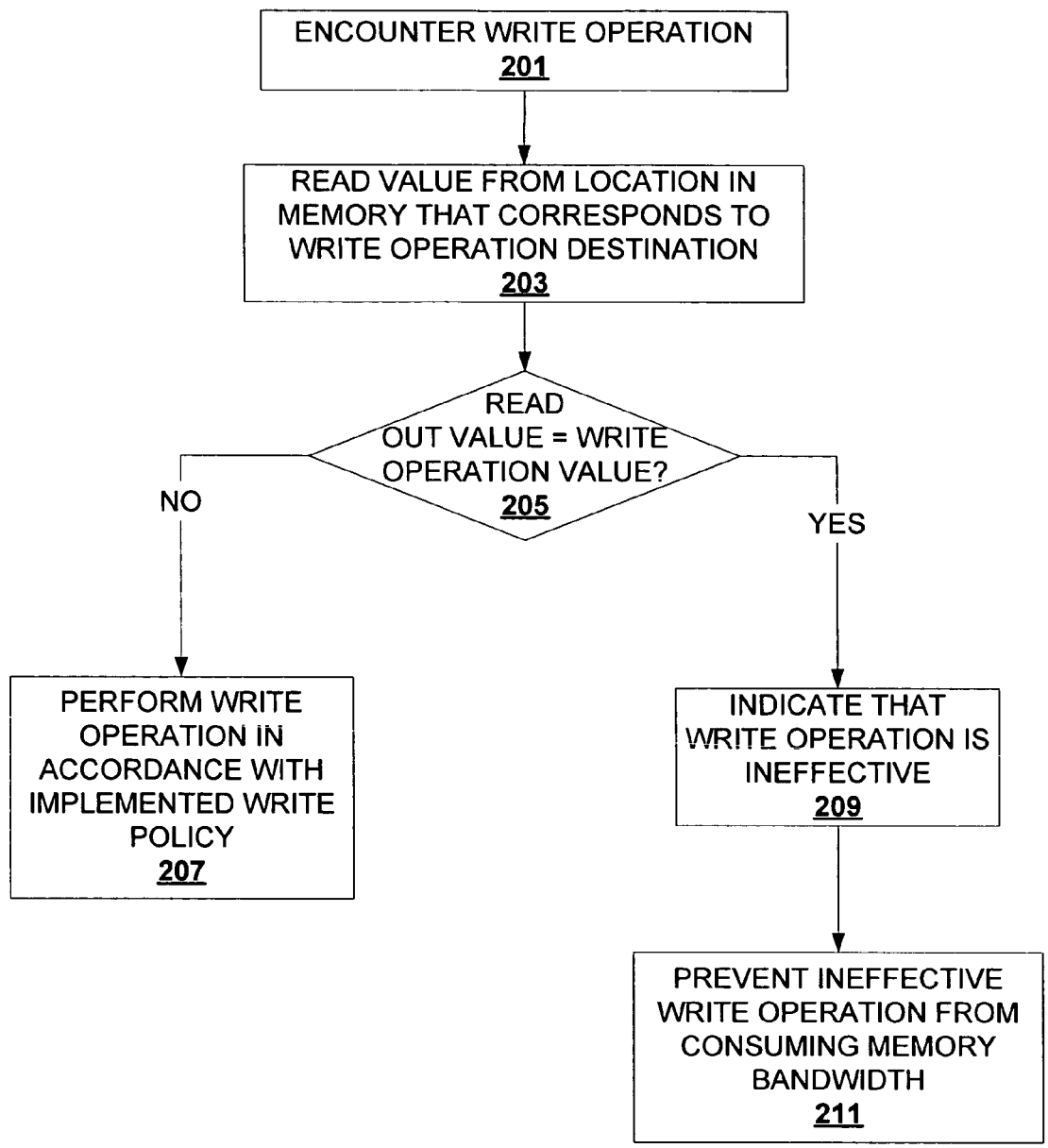
FIG. 2 depicts an exemplary flowchart for identifying ineffective write operations.

FIG. 2 depicts an exemplary flowchart for identifying ineffective write operations. At block 201, a write operation is encountered. At block 203, a value is read from a location in memory that corresponds to a destination of the write operation. At block 205, it is determined whether the value read out from the memory location is substantially similar to the value of the write operation. The values may be of different sizes (e.g., word, half-word, byte, etc.). Realizations may utilize a byte mask to compare values of different sizes. If the values do not substantially match, then control flows to block 207. If the values match substantially, then control flows to block 209.

At block 207, the write operation is performed in accordance with the implemented write policy (e.g., write-back, write-through, an intermediate write-through policy, etc.).

At block 209, the write operation is indicated as ineffective. For example, the location is not marked or updated, the location is set to 'valid' status, an indication is sent to a memory controller, a flag is set, etc. At block 211, the ineffective write operation is prevented from consuming memory bandwidth. If the write policy is write-back, then the current contents of the location are not marked as dirty and not evicted. Preventing eviction of a resident value from an ineffective write operation prevents the memory controller from performing a redundant write to system memory. In an exemplary system that implements a write-through write policy, a memory controller receives indication that an incoming or resident write operation is ineffective, and foregoes the write operation. In another exemplary illustration, a system may buffer write operations and write to system memory in batches. The memory controller invalidates those entries in the buffer that host ineffective write operations.

While the flow diagram shows a particular order of operations performed by certain realizations of the invention, it should be understood that such order is exemplary (e.g., alternative realizations may perform the operations in a different order, combine certain operations, overlap certain operations, perform certain operations in parallel, etc.).

Figure 3:
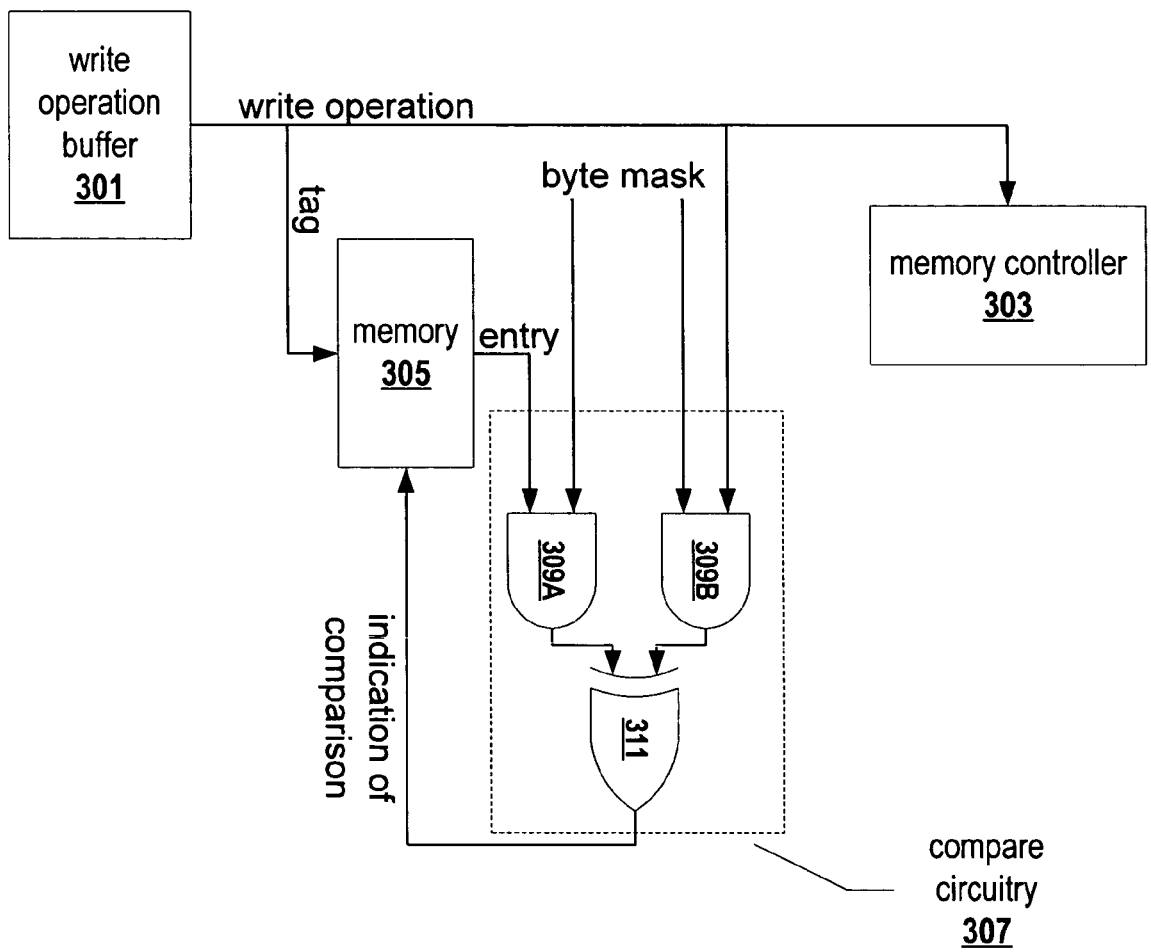
FIG. 3 depicts an exemplary compare circuitry to prevent ineffective write operations from consuming memory bandwidth.

FIG. 3 depicts an exemplary compare circuitry to prevent ineffective write operations from consuming memory bandwidth. A write operation buffer 301 (e.g., a store queue, a load/store queue, etc.) pops a write operation and sends the write operation to be performed by a memory controller 303. A tag from the write operation is input into a memory 305 (e.g., L1 cache, L2 cache, L3 cache, etc.). The memory 305 selects an entry in accordance with the tag and outputs the contents of the selected entry to a compare circuitry 307. The compare circuitry 307 includes a set of AND gates 309A and a set of AND gates 309B. The compare circuitry 307 also includes an XOR gate 311. The selected entry from the memory 305 is input into the set of AND gates 309A. A byte mask is also supplied to the set of AND gates 309A. A value from the write operation is input into the set of AND gates 309B of the compare circuitry 307. The byte mask is also supplied to the set of AND gates 309B. The byte mask is applied to facilitate comparison between values of different sizes (e.g., facilitate comparison of a half-word value with a word value). In an exemplary realization, each of the set of AND gates 309A and 309B comprises 32 gates with 1-bit output. Output from the sets of AND gates 309A-309B are input into the XOR gate 311. The XOR gate 311 outputs an indication of the comparison of values. For example, if the data inputs into the XOR gate 311 are 4b'1111 and 4b'1111, then the output is the vector of bits 4b'0000. This status indication is input into the memory 305 to mark the previously selected entry. For example, output from the compare circuitry 307 feeds into a conventional data/logic path of a processor used for performing store operations. Intelligently marking entries to indicate modification instead of reflexively marking entries as modified (i.e., "dirty") saves a substantial amount of bandwidth by foregoing writing of an entire cache line, which has no effect.

Recognition and proper handling of ineffective write operation can be applied to a shared memory system to conserve resources. In a shared memory system, although a processing unit that owns a shared memory location may be aware that a write operation was ineffective, a controller for the shared memory may not be aware that the processing unit encountered an ineffective write operation. Even though a processing unit did not actually perform the ineffective write operation, the perspective of units external to the processing unit is that the write operation has been performed. For example, the directory at the memory controller of the shared memory changes state for the shared memory location to "M" to reflect that the owning processing unit has modified the data and that the data at the shared memory location is dirty, contrary to the actual events. To remedy this disparity between the externally perceived state of the data at the shared memory location and the actual state of the data, the owning processing unit can respond with an indication (e.g., an acknowledgement packet) that the data at the shared memory location is current (i.e., that the owning processing unit has not changed the data). Such an indication can be done without consuming a large amount of bandwidth (e.g., transmitting a byte size packet instead of a packet with data from an entire line of cache).

Figure 4:
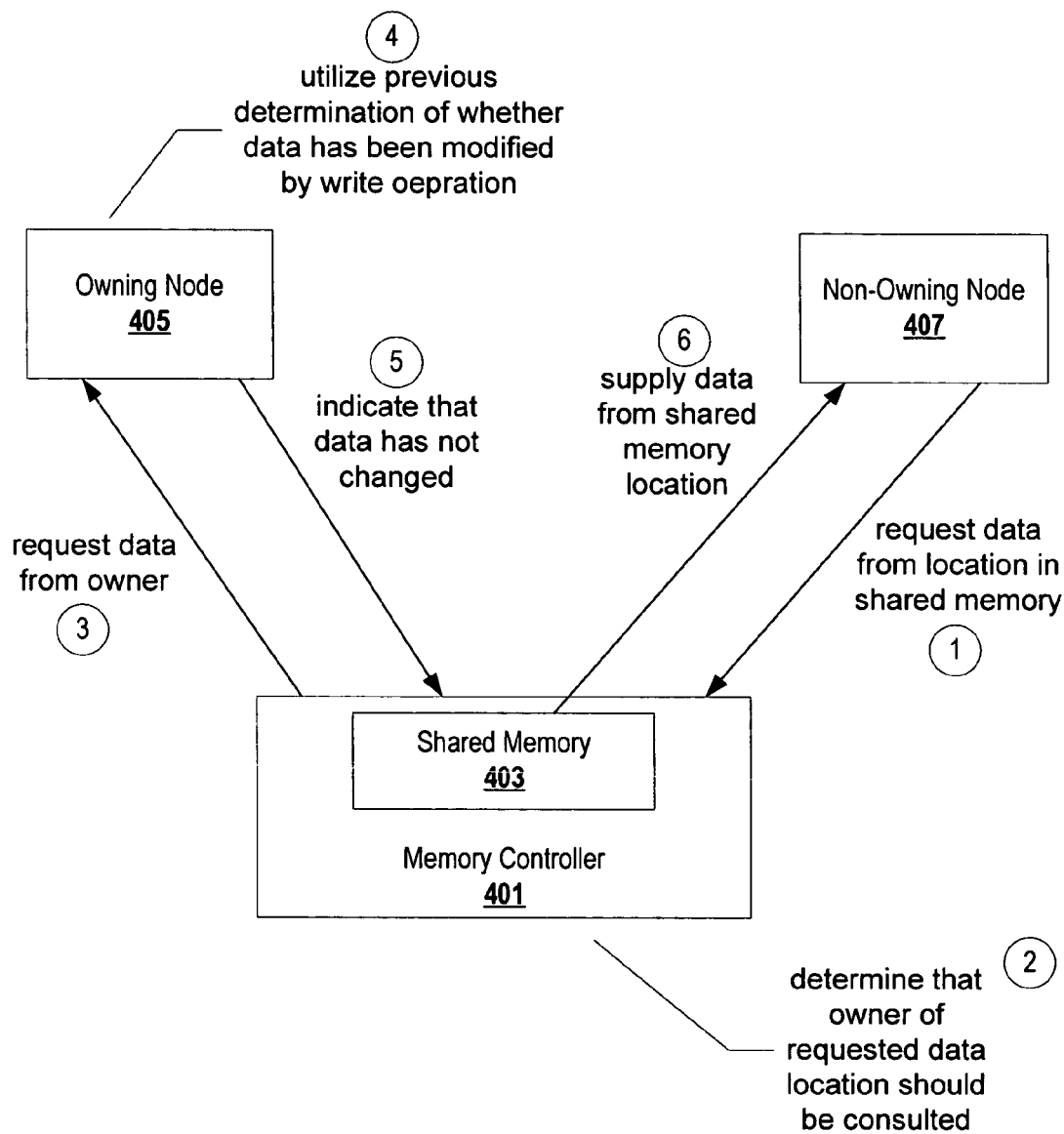
FIG. 4 depicts an exemplary shared memory system that reduces unnecessary consumption of resources.

FIG. 4 depicts an exemplary shared memory system that reduces unnecessary consumption of resources. A shared memory system includes a node 405 and 407, a shared memory 403 (e.g., L3 cache), and a memory controller 401 for the shared memory 403. The nodes 405 and 407 may be different cores on the same chip, may be different processors within the same system, a core on a multi-core die and a single core processor, etc. The node 405 has a line of cache with the most up-to-date data for a location 'A' in the shared memory 403, thus the node 405 is the owning node for that shared memory location. At a time 1, the non-owning node 407 requests data at the location 'A' (e.g., to read, take ownership, write, etc.). At a time 2, the memory controller 401 determines whether the owner of the location 'A' should be consulted. For example, the memory controller 401 determines the current state of the data at the location 'A' indicated by a memory coherence directory. If the data at the location 'A' is dirty, then the memory controller 401 requests a copy of the most current data for 'A' from the owning node, which is the node 405 in FIG. 4, at a time 3 (e.g., a copyback request is transmitted from the memory controller 401 to the node 405). At a time 4, the owning node 405 determines whether the data has been changed.

It is assumed that the node 405 includes logic to determine whether a write operation is ineffective, such as that depicted in FIG. 3. At a time 4, the owning node 405 utilizes a previous determination of whether data has been modified by a write operation (i.e., examines the entry to determine if it has been marked as modified or not). The node 405 also includes logic that parses the request from the memory controller and inspects the entry that corresponds to location 'A' in response to the request. Although the directory at the memory controller 401 indicates that the location 'A' has been modified by the owning node 405, the node 405 determines that it has not modified the data at the location 'A' (at least for this example) because state at the node 405 is not dirty. Hence, the data at the cache line that corresponds to 'A' is indicated as clean or valid by the node 405. Since the data is valid, the owning node 405 indicates to the memory controller 401 at a time 5 that the data has not changed, for example with an acknowledgement packet, and that the data at 'A' in the shared memory is valid. The memory controller 401 includes logic to parse responses from nodes. In this scenario, the memory controller 401 parses the response from the node 405 and determines the response to be an indication that the data at the location 'A' in the shared memory 403 is current. The memory controller 401 updates the state for the memory location 'A' and supplies the data at 'A' to the non-owning node 407 at a time 6. Thus, the data consumes bandwidth only when sent from the shared memory 403 to the node 407, instead of consuming bandwidth for delivery from the owning node 405 to the shared memory 403 and from the shared memory 403 to the node 407. If the owning node 405 had determined that the data had changed (i.e., the last write operation was effective), then the owning node 405 would transmit a copy of the data to the memory controller 401 to update the location 'A' in the shared memory 403.

Communicating that the preceding write operations by the owning processing unit have been ineffective (i.e., there has been no change in the data despite the occurrence of write operations) with such an indication maintain coherency without unnecessarily over-consuming resources, while preserving already supported coherency protocols.

The described invention may be provided as a computer program product, or software, that may include a machine-readable medium having stored thereon instructions, which may be used to program a computer system (or other electronic devices) to perform a process according to the present invention. A machine readable medium includes any mechanism for storing information in a form (e.g., software, processing application) readable by a machine and/or cluster of machines (e.g., a computer or network of computers). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Figure 5:
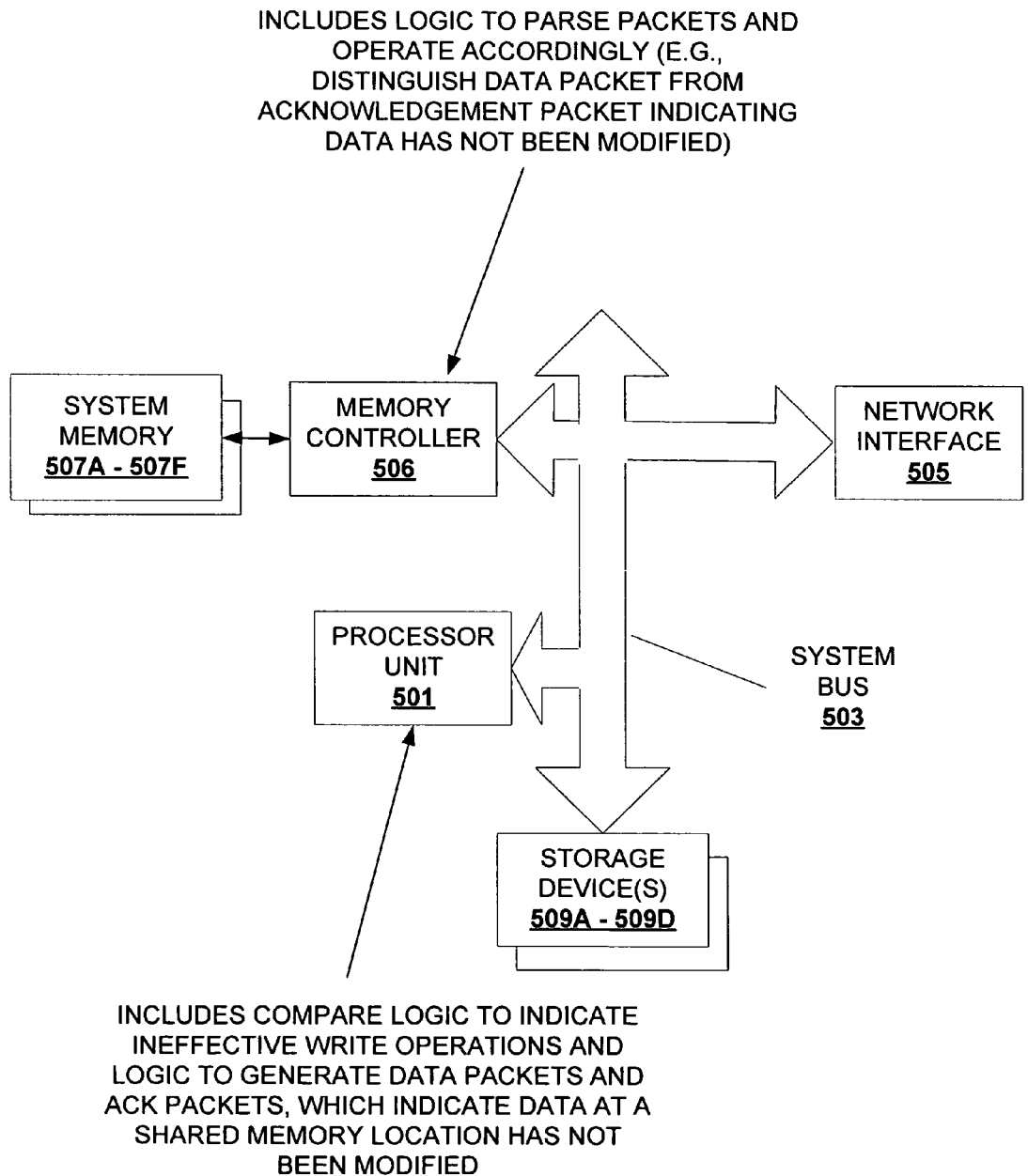
FIG. 5 depicts an exemplary computer system according to realizations of the invention.

FIG. 5 depicts an exemplary computer system according to realizations of the invention. A computer system includes a processor unit 501 (possibly including multiple processors, a single threaded processor, a multi-threaded processor, a multi-core processor, etc.). Although not illustrated, the depicted system may also include other processing units. The computer system also includes a system memory a memory controller 506, 507A-507F (e.g., one or more of cache, SRAM, RDRAM, EDO RAM, DDR RAM, EEPROM, etc.), a system bus 503 (e.g., LDT, PCI, ISA, etc.), a network interface 505 (e.g., an ATM interface, an Ethernet interface, a Frame Relay interface, etc.), and a storage device(s) 509A-509D (e.g., optical storage, magnetic storage, etc.). Realizations of the invention may include fewer or additional components not illustrated in FIG. 5 (e.g., video cards, audio cards, additional network interfaces, peripheral devices, etc.). The processor unit 501, the storage device(s) 509A-509D, the network interface 505, and the memory controller 506 are coupled to the system bus 503. The system memory 507A-507F is coupled to the memory controller 506. The processor unit 501 includes a compare circuitry to indicate ineffective write operations and circuitry to generate data packets (e.g., conveying update(s) for a shared memory location) and acknowledgement packets, which indicate that data at a shared memory location (or multiple shared memory locations) has not been modified by the processing unit 501. A portion or all of the compare circuitry functionality may be emulated with instructions embodied in the system memory 507A-507F and/or the processor unit 501 (e.g., assembly instruction(s), firmware, etc.). Compare circuitry emulation may include one or more instructions to compare values of write operations and values of corresponding entries in a cache. The software emulation may also mark write operations as ineffective.

While the invention has been described with reference to various realizations, it will be understood that these realizations are illustrative and that the additions, and improvements are possible. For example, the described invention has presumed write operations between cache and system memory, although the described invention may be applied at any level of a memory hierarchy. The underlying memory may be persistent storage. Hence, write operations that are ineffective, as determined with values from system memory, are not written to corresponding locations in persistent storage. Similarly, the underlying memory may be L2 cache instead of system memory. Hence, values from L1 cache are compared with values of write operations destined for L2 cache, and the values of ineffective write operations are not written to the L2 cache. More generally, realizations in accordance with the present invention have been described in the context of particular realizations. These realizations are meant to be illustrative and not limiting. Accordingly, plural instances may be provided for components described herein as a single instance. For instance, the examples herein depict shared memory as a single block with a single memory controller. However, shared memory may be realized with multiple separate physical instances, controlled by corresponding memory controllers (e.g., two memory controllers controlling three or more memory units that are shared in a system, a memory controller for each shared memory unit, etc.). Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method for reducing consumption of memory bandwidth in a shared memory system, the method comprising:

determining that data at a location in a shared memory is current according to a node that owns the shared memory location;

supplying an indication that the data at the shared memory location is current instead of supplying a data packet, wherein a state maintained external to the owning node for the shared memory location indicates that the data at the shared memory location is dirty.

2. The method of claim 1, wherein the determining comprises checking state for the shared memory location according to the owning node.

3. The method of claim 1,
wherein at least two states are maintained for the shared memory location,
wherein a first of the two states reflects both effective and ineffective write operations, the state that indicates dirty being the first state,
wherein a second of the two states reflects only effective write operations.

4. The method of claim 3, wherein a memory controller of the shared memory maintains the first state and the owning node maintains the second state.

5. The method of claim 1, wherein the indication includes an acknowledgement packet that is smaller than the data packet.

6. The method of claim 1 further comprising:
responsive to the indication, transmitting the data at the shared memory location to a node that has requested data from the shared memory location.

7. The method of claim 6 further comprising updating the state to indicate that the data at the shared memory location is valid, in response to the indication.

8. The method of claim 1 embodied as a computer program product encoded on one or more machine-readable media.

9. An apparatus comprising:
a memory;
a first logic operable to prevent ineffective write operations from causing state changes of entries in the memory;
an interface to communicate with a memory controller of a shared memory; and
a second logic operable to supply an indication to the memory controller of a state of an entry in the shared memory according to an entry in the memory that represents the shared memory entry responsive to a request from the memory controller for data at the entry of the memory if the data at the entry of the memory is clean, and operable to additionally supply the data at the entry of the memory if the data is indicated as dirty.

10. The apparatus of claim 9 further comprising the first logic operable to determine whether a write operation is ineffective.

11. The apparatus of claim 9 further comprising the memory controller, the memory controller having logic operable to parse an indication and operable to update a state for the shared memory entry in accordance with the parsed indication, and operable to transmit a copy of data at the entry in the shared memory to a requestor if the indication indicates the state for the shared memory entry is clean.

12. The apparatus of claim 9, wherein the second logic is further operable to check state of an entry in the memory responsive to a request from a memory controller for data at the entry.

13. The apparatus of claim 12, wherein the memory includes at least one of L1 cache, L2 cache, L3 cache, and random access memory.

14. The apparatus of claim 9, wherein the shared memory includes at least one of L2 cache, L3 cache, random access memory, and persistent storage.

15. A memory controller comprising:
a first logic operable to parse packets from owning nodes and distinguish those packets that indicate updates for a location in a shared memory controlled by the memory controller from those packets that indicate a location in the shared memory as being clean; and
a second logic operable to generate packets for requester nodes in accordance with packets from owning nodes parsed by the first logic.

16. The memory controller of claim 15 further comprising a third logic to update state for a location in the shared memory to clean if a corresponding packet from a node that owns the location indicates the location as clean, wherein the state of the location prior to the update was dirty because the owning node encountered a write operation for the location.

17. The memory controller of claim 15, wherein the second logic is further requester node if the first logic determines that a corresponding packet from an owning node indicates that data at the shared memory location is clean, and operable to forward data from an owning node to a requester node if a packet from the owning node indicates one or more updates for a location in the shared memory that corresponds to the packet from the owning node.

18. An apparatus comprising:
a bus; and
means for indicating clean state for a location in shared memory from a node that owns the location to a memory controller that indicates dirty state for the location because of an ineffective write operation encountered by the owning node.

19. The apparatus of claim 18 further comprising means for preventing transmission of the data from the owning node to the memory controller, if the state for the location is clean.

20. The apparatus of claim 18 further comprising means for updating state for the location as maintained by the memory controller to reflect state as maintained by the owning node.

* * * * *

UNITED STATES PATENT AND TRADEMARK OFFICE
CERTIFICATE OF CORRECTION

PATENT NO. : 7,366,848 B1
APPLICATION NO. : 11/143165
DATED : April 29, 2008
INVENTOR(S) : Balakrishna Venkatrao It is certified that error appears in the above-identified patent and that said Letters Patent is hereby corrected as shown below:

In column 8, at line 30, after "further" insert --operable to copy data from a location in the shared memory and supply the data to a--.

Signed and Sealed this

Twenty-ninth Day of July, 2008

JON W. DUDAS
*Director of the United States Patent and Trademark Office*